(12) United States Patent
Oh et al.

(10) Patent No.: US 9,759,963 B2
(45) Date of Patent: Sep. 12, 2017

(54) LIQUID CRYSTAL DISPLAY

(71) Applicant: Samsung Display Co., Ltd., Yongin, Gyeonggi-Do (KR)

(72) Inventors: Hwa Yeul Oh, Seoul (KR); Yeon-Mun Jeon, Hwaseong-si (KR); Young Je Cho, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 76 days.

(21) Appl. No.: 14/475,739

(22) Filed: Sep. 3, 2014

(65) Prior Publication Data

US 2015/0070642 A1  Mar. 12, 2015

(30) Foreign Application Priority Data

Sep. 12, 2013 (KR) .................. 10-2013-0109999

(51) Int. Cl.
*G02F 1/1337* (2006.01)
*G02F 1/1343* (2006.01)

(52) U.S. Cl.
CPC .. *G02F 1/134363* (2013.01); *G02F 1/133707* (2013.01); *G02F 2001/134318* (2013.01)

(58) Field of Classification Search
USPC ........................................................ 349/141
See application file for complete search history.

(56) References Cited

U.S. PATENT DOCUMENTS

| 6,088,078 | A | 7/2000 | Kim et al. |
| 6,128,061 | A | 10/2000 | Lee et al. |
| 6,452,657 | B1 | 9/2002 | Suzuki et al. |
| 7,492,428 | B2 | 2/2009 | Lee |
| 7,782,415 | B2 | 8/2010 | Sasaki |
| 8,189,158 | B1 * | 5/2012 | Kuo ................. G02F 1/134309 349/141 |
| 2013/0033666 | A1 * | 2/2013 | Chung ............. G02F 1/134363 349/126 |

FOREIGN PATENT DOCUMENTS

| JP | 2000-038584 A | 2/2000 |
| KR | 1020070064733 A | 6/2007 |
| KR | 1020080062545 A | 7/2008 |
| KR | 1020090126466 A | 12/2009 |
| KR | 1020100068636 A | 6/2010 |
| KR | 1020110072310 A | 6/2011 |
| KR | 101163396 B1 | 7/2012 |

* cited by examiner

*Primary Examiner* — Wen-Ying P Chen
(74) *Attorney, Agent, or Firm* — Cantor Colburn LLP

(57) ABSTRACT

A liquid crystal display includes: a first substrate; a first electrode on the first substrate, and a plurality of first cutouts defined in the first electrode; an insulating layer on the first electrode; a second electrode on the insulating layer, a plurality of second cutouts defined in the second electrode, and a plurality of branch electrodes defined by the plurality of second cutouts; a second substrate facing the first substrate; and a liquid crystal layer between the first substrate and the second substrate. The second cutouts have a linear shape which extends in a length direction, widths of the plurality of first cutouts is larger than that of the plurality of branch electrodes in a width direction crossing the length direction, and the second cutouts overlap the plurality of first cutouts, in the length direction.

10 Claims, 14 Drawing Sheets

LIQUID CRYSTAL DISPLAY

This application claims priority to Korean Patent Application No. 10-2013-0109999 filed on Sep. 12, 2013, and all the benefits accruing therefrom under 35 U.S.C. §119, the entire contents of which are incorporated herein by reference.

BACKGROUND (a) Technical Field

The invention relates to a liquid crystal display.

(b) Description of the Related Art

A liquid crystal display, which is one of flat panel displays which have been widely used, is a display which includes two display panels in which field generating electrodes are disposed, and a liquid crystal layer interposed therebetween to apply a voltage to the electrode so as to change directions of liquid crystal molecules of the liquid crystal layer, thereby controlling transmittance of light passing through the liquid crystal layer.

In the liquid crystal display, a pixel electrode and a common electrode which generate an electric field applied to the liquid crystal layer may be disposed in a single display panel in which a switching element is further disposed.

When the pixel electrode and the common electrode which generate the electric field in the liquid crystal layer are disposed in the single display panel of the liquid crystal display, the pixel electrode and the common electrode overlap each other, having an insulating layer disposed therebetween. As a size of the liquid crystal display is increased, an overlapping area between the pixel electrode and the common electrode is increased and thus storage capacitance is increased to a desired value or more, such that charging a desired amount of electrical charge in the pixel electrode may take a relatively large amount of time, thereby causing a signal delay in the liquid crystal display.

SUMMARY

One or more exemplary embodiment of the invention provides a liquid crystal display capable of reducing or effectively preventing a signal delay and reducing or effectively preventing deterioration in display quality thereof by reducing a change in storage capacitance even when a mis-alignment of a pixel electrode and a common electrode occurs, by including the pixel electrode and the common electrode which generate an electric field in a liquid crystal layer in a single display panel and reducing an overlapping area between the pixel electrode and the common electrode.

An exemplary embodiment of the invention provides a liquid crystal display, including: a first substrate; a first electrode on the first substrate and a plurality of first cutouts defined in the first electrode; an insulating layer on the first electrode; a second electrode on the insulating layer, a plurality of second cutouts defined in the second electrode, and a plurality of branch electrodes defined by the plurality of second cutouts; a second substrate facing the first substrate; and a liquid crystal layer between the first substrate and the second substrate. The second cutouts have a linear shape which extends in a length direction, widths of the plurality of first cutouts is larger than those of the plurality of branch electrodes, in a width direction crossing the length direction, and the second cutouts overlap the plurality of first cutouts, in the length direction.

The plurality of first cutouts may each have a discrete plane shape of a polygon, a quadrangle, a hexagon, a circle an oval, and the like.

The plurality of first cutouts may have a uniform size or have different sizes.

The widths of the plurality of first cutouts may be larger than those of the plurality of branch electrodes by about 0.4 micrometer ($\mu$m) or more.

The liquid crystal display may further include: a gate line and a data line on the first substrate, and the plurality of branch electrodes may extend in parallel with the gate line or the data line.

The first electrode may be a pixel electrode and the second electrode may be a common electrode, the second electrode may be on a whole surface of the first substrate, and the plurality of branch electrodes may overlap the pixel electrode.

The first electrode may be a common electrode and the second electrode may be a pixel electrode, the first electrode may be on a whole surface of the first substrate, and the plurality of first cutouts may overlap the pixel electrode.

According to one or more exemplary embodiment of a liquid crystal display according to the invention, the signal delay may be reduced or effectively prevented, and deterioration in the display quality may be reduced or effectively prevented by reducing the change in storage capacitance between a pixel and a common electrode even when the mis-alignment of the pixel and common electrodes occurs, by forming the pixel electrode and the common electrode which generate the electric field in the liquid crystal layer in a single display panel and reducing the overlapping area between the pixel electrode and the common electrode.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION

Figure 1:
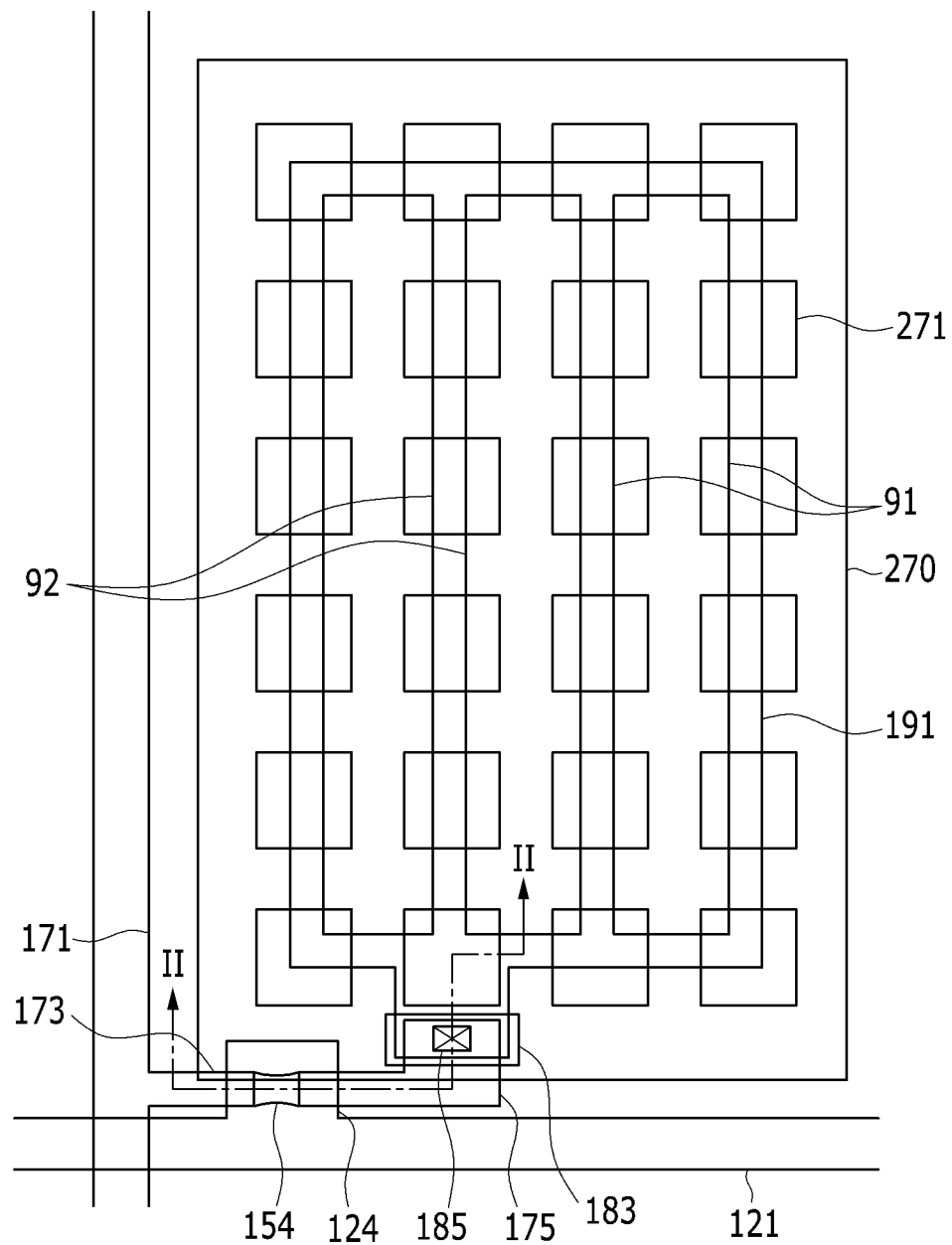
FIG. 1 is a plan view of an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "beneath" relative to other elements or features would then be oriented "above" relative to the other elements or features. Thus, the exemplary term "beneath" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to reduce or effectively prevent a signal delay in a liquid crystal display, a channel width of a thin film transistor as the switching element transferring a data voltage to the pixel electrode may be increased and/or a driving voltage of the liquid crystal display may be increased. However, when the channel width of the thin film transistor is increased, an aperture ratio of the liquid crystal display is reduced and when the driving voltage is increased, voltage consumption is increased, thereby increasing costs of the liquid crystal display.

Therefore, there is provided a method for reducing an overlapping area between the pixel electrode and the common electrode, by forming the pixel electrode and the common electrode in a single display panel of the liquid crystal display and defining cutouts or openings which are elongated to extend in parallel with each other, in the pixel electrode and/or the common electrode.

However, in a method for defining the cutouts which are elongated to extend parallel with each other in the pixel electrode and the common electrode, when a mis-alignment between the pixel electrode and the common electrode occurs, the overlapping area between the pixel electrode and the common electrode is changed and thus the storage capacitance and the transmittance is changed, thereby causing deterioration in a display quality of the liquid crystal display.

Hereinafter, the invention will be described in detail with reference to the accompanying drawings.

Figure 2:
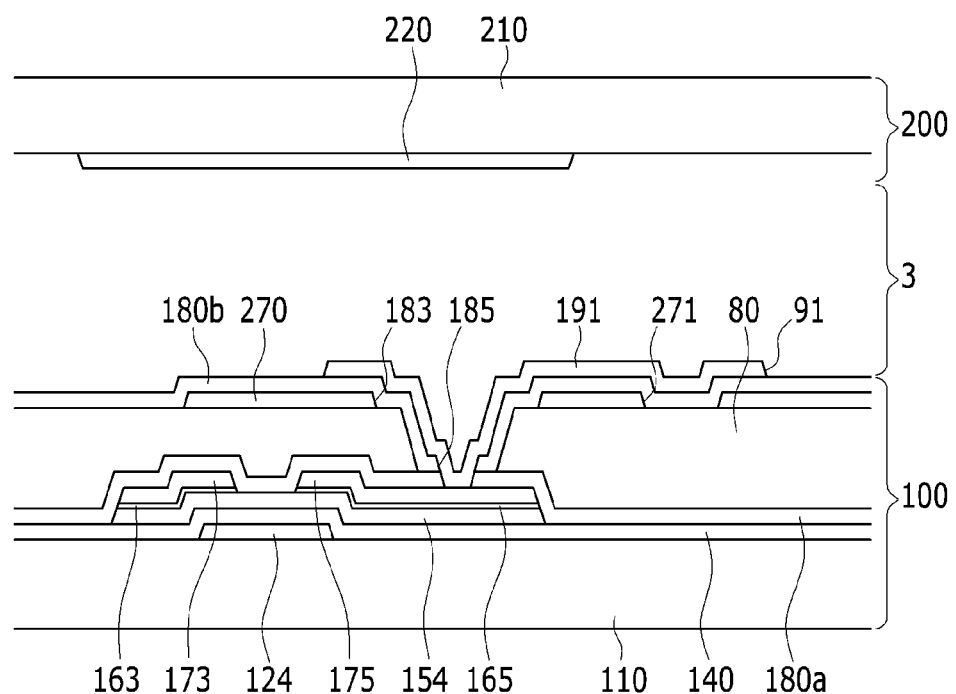
FIG. 2 is a cross-sectional view of the liquid crystal display of FIG. 1 taken along line II-II.
Figure 3:
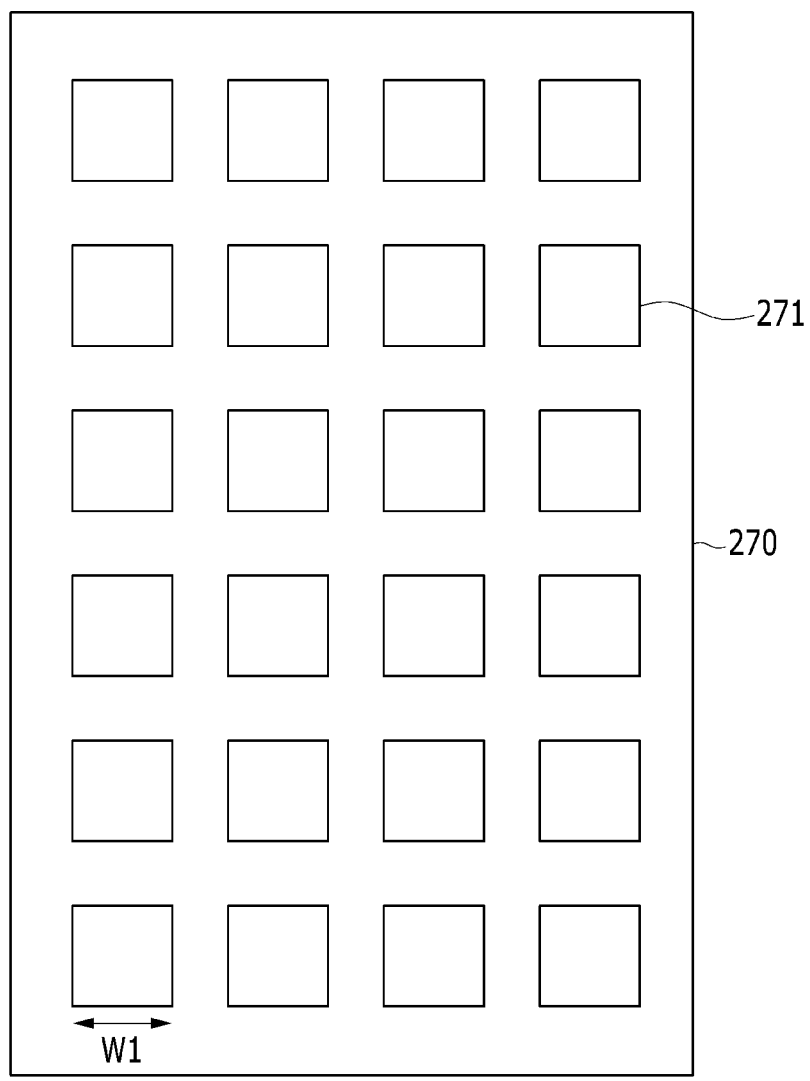
FIG. 3 is a plan view of an exemplary embodiment of a first field generating electrode of the liquid crystal display of FIG. 1.
Figure 4:
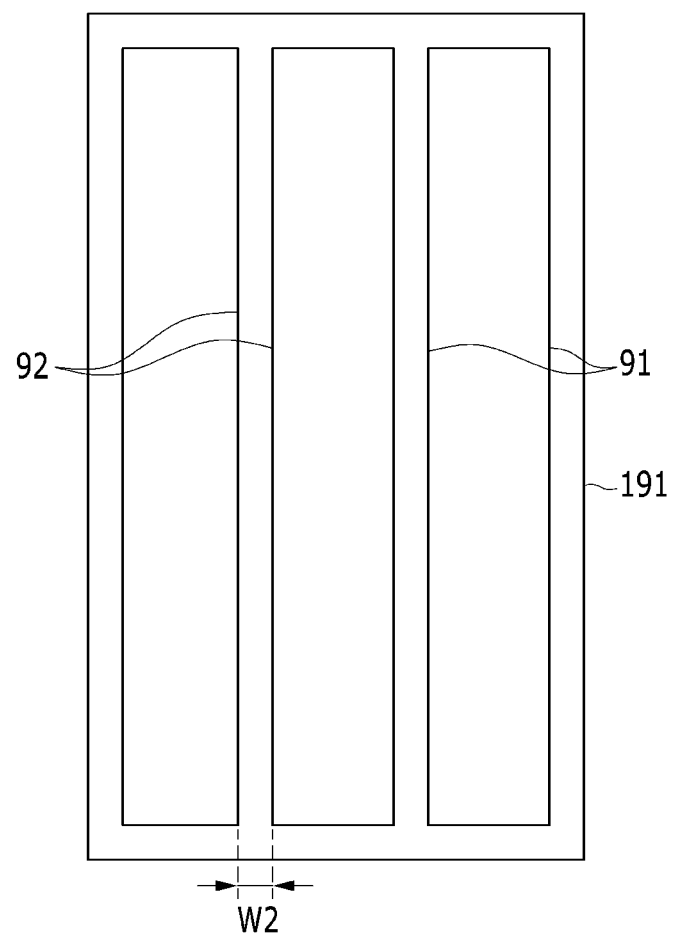
FIG. 4 is a plan view of an exemplary embodiment of a second field generating electrode of the liquid crystal display of FIG. 1.

Hereinafter, an exemplary embodiment of a liquid crystal display according to the invention will be described in detail with reference to FIGS. 1 to 4. FIG. 1 is a plan view of the exemplary embodiment of a liquid crystal display according to the invention, FIG. 2 is a cross-sectional view of the liquid crystal display of FIG. 1 taken along line II-II, FIG. 3 is a plan view of an exemplary embodiment of a first field generating electrode of the liquid crystal display of FIG. 1, and FIG. 4 is a plan view of an exemplary embodiment of a second field generating electrode of the liquid crystal display of FIG. 1.

Referring to FIGS. 1 to 4, the liquid crystal display includes a lower panel 100 and an upper panel 200 which face each other, and a liquid crystal layer 3 injected therebetween.

First, the lower panel 100 will be described.

A gate line 121 is disposed on a first insulating substrate 110 including transparent glass, plastic, or the like. The gate line 121 includes a gate electrode 124, and a gate pad part (not illustrated) for connection with another layer and/or an external driving circuit.

A gate insulating layer 140 including of silicon nitride (SiNx), silicon oxide (SiOx), or the like is disposed on the gate line 121. The gate insulating layer 140 may have a single layer structure, or a multilayer structure including at least two insulating layers having different physical properties.

A semiconductor 154 including amorphous silicon, polysilicon, or the like is disposed on the gate insulating layer 140. The semiconductor 154 may include an oxide semiconductor.

Ohmic contacts 163 and 165 are disposed on the semiconductor 154. The ohmic contacts 163 and 165 may include materials, such as n+ hydrogenated amorphous silicon, which is doped with an n-type impurity, such as phosphorus, at a high concentration, or may include silicide. The ohmic contacts 163 and 165 are paired and thus may be disposed on the semiconductor 154 in a pair. When the semiconductor 154 is includes the oxide semiconductor, the ohmic contacts 163 and 165 may be omitted.

A data line 171, a source electrode 173 extending from the data line 171, and a drain electrode 175 are disposed on the ohmic contacts 163 and 165 and the gate insulating layer 140.

The data line 171 includes a data pad part (not illustrated) for connection with another layer or an external driving circuit.

The data line 171 transfers a data signal and mainly extends in a first direction (e.g., vertical direction in FIG. 1) to intersect the gate line 121. The gate line 121 mainly extends in a second direction (e.g., horizontal direction in FIG. 1) to cross the first direction.

A first passivation layer 180*a* is disposed on the data line 171, the drain electrode 175, the gate insulating layer 140, and exposed portions of the semiconductor 154

The first passivation layer 180*a* includes an inorganic insulating material or an organic insulating material.

An organic layer 80 is disposed on the first passivation layer 180*a*. The organic layer 80 may be a color filter. When the organic layer 80 is a color filter, the organic layer 80 may uniquely display one of the primary colors, for example, the three primary colors, such as red, green and blue, or yellow, cyan and magenta, and the like. Although not illustrated, the color filter may display a mixed color of the primary colors or white color, in addition to the primary colors.

In an alternative exemplary embodiment, the organic layer 80 may be omitted.

A common electrode 270 is disposed on the organic layer 80. A plurality of first cutouts 271 are defined in the common electrode 270.

The liquid crystal display may include a plurality of common electrodes 270. The common electrodes 270 which are disposed at adjacent pixels are connected to each other, and a plurality of first cutouts 271 of the common electrode 270 are defined in each pixel region of the adjacent pixels.

A first opening 183 is further defined in the common electrode 270, at a portion where a first contact hole 185 to be described below is defined.

A second passivation layer 180*b* is disposed on the common electrode 270. The second passivation layer 180*b* includes an inorganic insulating material or an organic insulating material.

A pixel electrode 191 is disposed on the second passivation layer 180*b*. The liquid crystal display may include a plurality of pixel electrodes 191. The pixel electrode 191 is disposed in each of pixel region of adjacent pixels. A plurality of second cutouts 91 is defined in the pixel electrode 191. The pixel electrode 191 includes a plurality of first branch electrodes 92 which are defined by the plurality of second cutouts 91.

In the exemplary embodiment of the invention which is illustrated in FIGS. 1 and 2, the plurality of first branch electrodes 92 of the pixel electrode 191 extend in a direction parallel with a direction in which the data line 171 extends, but is not limited thereto. In another exemplary embodiment of a liquid crystal display according to the invention, the plurality of first branch electrodes 92 of the pixel electrode 191 may extend in a direction parallel with a direction in which the gate line 121 extends.

The first contact hole 185 is defined in the first passivation layer 180*a*, the organic layer 80 and the second passivation layer 180*b* and exposes a portion of the drain electrode 175. The pixel electrode 191 is connected to the drain electrode 175 through the first contact hole 185 to receive a data voltage from the drain electrode 175.

Although not illustrated, a first alignment layer is disposed on the pixel electrode 191. The first alignment layer may be a horizontal alignment layer and is rubbed in a predetermined direction. However, in another exemplary embodiment of the liquid crystal display according to the invention, the first alignment layer may be a photo-aligned material, including a photo-reactive material.

Next, the upper panel 200 will be described.

A light blocking member 220 is disposed on a second insulating substrate 210 including transparent glass, plastic, or the like. In an alternative exemplary embodiment of a liquid crystal display according to the invention, the light blocking member 200 may be disposed in the lower panel 100 and the color filter may be further disposed in the upper panel 200.

Although not illustrated, a second alignment layer is disposed on an inner surface of the upper panel 200. The second alignment layer may be a horizontal alignment layer and is rubbed in a predetermined direction. However, in another exemplary embodiment of the liquid crystal display according to the invention, the second alignment layer may be a photo-aligned material, including a photo-reactive material.

The liquid crystal layer 3 includes a liquid crystal material having a positive dielectric anisotropy. A liquid crystal molecule of the liquid crystal layer 3 has a direction of a major axis arranged in parallel with the display panels 100 and 200. However, in another exemplary embodiment of the liquid crystal display according to the invention, the liquid crystal layer 3 may have a negative dielectric anisotropy.

The pixel electrode 191 receives the data voltage from the drain electrode 175, and the common electrode 270 receives the common voltage having a predetermined size from a common voltage applying unit (not shown) which is disposed outside a display region of the liquid crystal display.

The pixel electrode 191 and the common electrode 270 which are the field generating electrodes of the liquid crystal display, generate an electric field, such that liquid crystal molecules of the liquid crystal layer 3 disposed between the two field generating electrodes 191 and 270 rotate in a direction substantially parallel with a direction of the electric field. The polarization of light passing through the liquid crystal layer 3 is changed according to the rotating direction of the liquid crystal molecules determined as described above.

Next, a plane shape of the first field generating electrode and the second field generating electrode of the liquid crystal display according to the invention will be described in more detail with reference to FIGS. 3 and 4.

Referring to FIG. 3, the common electrode 270 which is the first field generating electrode, and the pixel electrode 191 which is the second field generating electrode overlap each other with the second passivation layer 180b disposed therebetween. The plurality of first cutouts 271 is defined in the common electrode 270 and the common electrode 270 is disposed beneath the second passivation layer 180b in a cross-sectional thickness direction of the liquid crystal display.

FIG. 3 is a diagram illustrating the common electrode 270 disposed in a single pixel region. A collective common electrode member including a plurality of the common electrodes 270 is disposed on a whole surface of the first insulating substrate 110, and a plurality of first cutouts 271 is defined in the common electrode 270 disposed in each single pixel region among a plurality of pixel regions defined on the first insulating substrate 110.

As illustrated in FIG. 3, each of the plurality of first cutouts 271 defined in the common electrode 270 which is the first field generating electrode of the liquid crystal display, has a quadrangular shape in the plan view. Each of the plurality of first cutouts 271 has a first width W1. The first width W1 of a first cutout 271 may be taken in the horizontal direction of FIG. 3, and a length of the first cutout 271 may be taken in the vertical direction of FIG. 3. The plurality of first cutouts 271 is spaced apart from each other in both the vertical and horizontal directions of FIG. 3. The first cutout 271 is considered a discrete shape as portions of the common electrode 270 solely define the discrete shape of the first cutout 271. Widths and lengths of elements may be defined by the maximum dimensions in the respective directions thereof.

According to the exemplary embodiment of the invention which is illustrated in FIG. 3, dimensions (e.g., sizes) of the plurality of first cutouts 271 are substantially uniform within one common electrode 270, but are not limited thereto. In another exemplary embodiment of the liquid crystal display according to the invention, the sizes of the plurality of first cutouts 271 may be different from each other within one common electrode 270.

Referring to FIG. 4, the common electrode 270 which is the first field generating electrode, and the pixel electrode 191 which is the second field generating electrode overlap each other with the second passivation layer 180b disposed therebetween. The plurality of second cutouts 91 is defined in the pixel electrode 191 and the pixel electrode 191 is disposed on the second passivation layer 180b in a cross-sectional thickness direction of the liquid crystal display. The pixel electrode 191 includes the plurality of first branch electrodes 92 which is defined by the plurality of second cutouts 91.

Each of the first branch electrode 92 has a second width W2. The second width W2 of a first branch electrode 92 may be taken in the horizontal direction of FIG. 4. A length of a second cutout 91 may be taken in the vertical direction of FIG. 4. The plurality of second cutouts 91 is spaced apart from each other in the horizontal direction of FIG. 4, and elongated in the vertical direction of FIG. 4.

A length of the plurality of first cutouts 271 of the first field generating electrode 270 is smaller than that of one of the second cutouts 91 of the second field generating electrode 191. A second cutout 91 of the second field generating electrode 191 overlaps a group of first cutouts 271 among the plurality of first cutouts 271 of the first field generating electrode 270, along a length direction of the plurality of cutouts 91 of the second field generating electrode 191. That is, the second cutouts 91 of the second field generating electrode 191 respectively have a substantially linear or bar shape which extends in a predetermined direction, and a second cutout 91 may have a length corresponding to an entire length of the group of first cutouts 271 among the plurality of first cutouts 271 of the first field generating electrode 270. A single one of the linear or bar shape second cutout 271 may overlap the group of first cutouts 271.

In one exemplary embodiment, the first width W1 of a first cutout 271 among the plurality of first cutouts 271 is larger than the second width W2 of the first branch electrode 92, and in more detail, the first width W1 of the first cutout 271 is larger than the second width W2 of the first branch electrode 92 by about 0.4 micrometers ($\mu$m) or more.

As such, since the first width W1 of the first cutout 271 is larger than the second width W2 of the first branch electrode 92, overlapping areas between the plurality of first cutouts 271 and the first branch electrodes 92 may not be changed even when an alignment error occurs between the first field generating electrode and the second field generating electrode, thereby reducing or effectively preventing the overlapping area between the first field generating electrode and the second field generating electrode from being changed.

The first cutouts and the second cutouts are respectively defined in the first field generating electrode and the second field generating electrode which overlap each other to reduce the overlapping area between the first field generating electrode and the second field generating electrode and to reduce or effectively prevent the storage capacitance from increasing, thereby reducing or effectively preventing the signal delay of the liquid crystal display. Further, the first cutouts have a quadrangular shape and the first cutouts are spaced apart from each other, the plurality of first branch electrodes which are defined by the second cutouts is disposed to extend in a predetermined direction. The first width of the plurality of first cutouts is larger than the second width of the first branch electrodes, such that even though the alignment error occurs between the first field generating electrode and the second field generating electrode, the overlapping areas between the plurality of first cutouts and the first branch electrodes may not be changed, thereby preventing the overlapping area between the first field generating electrode and the second field generating electrode from being changed. Even though the alignment error occurs between the first field generating electrode and the second field generating electrode, the storage capacitance is not changed, thereby reducing or effectively preventing the display quality of the liquid crystal display from deteriorating.

Next, another exemplary embodiment of a liquid crystal display according to the invention will be described in detail with reference to FIGS. 5 to 6.

Figure 5:
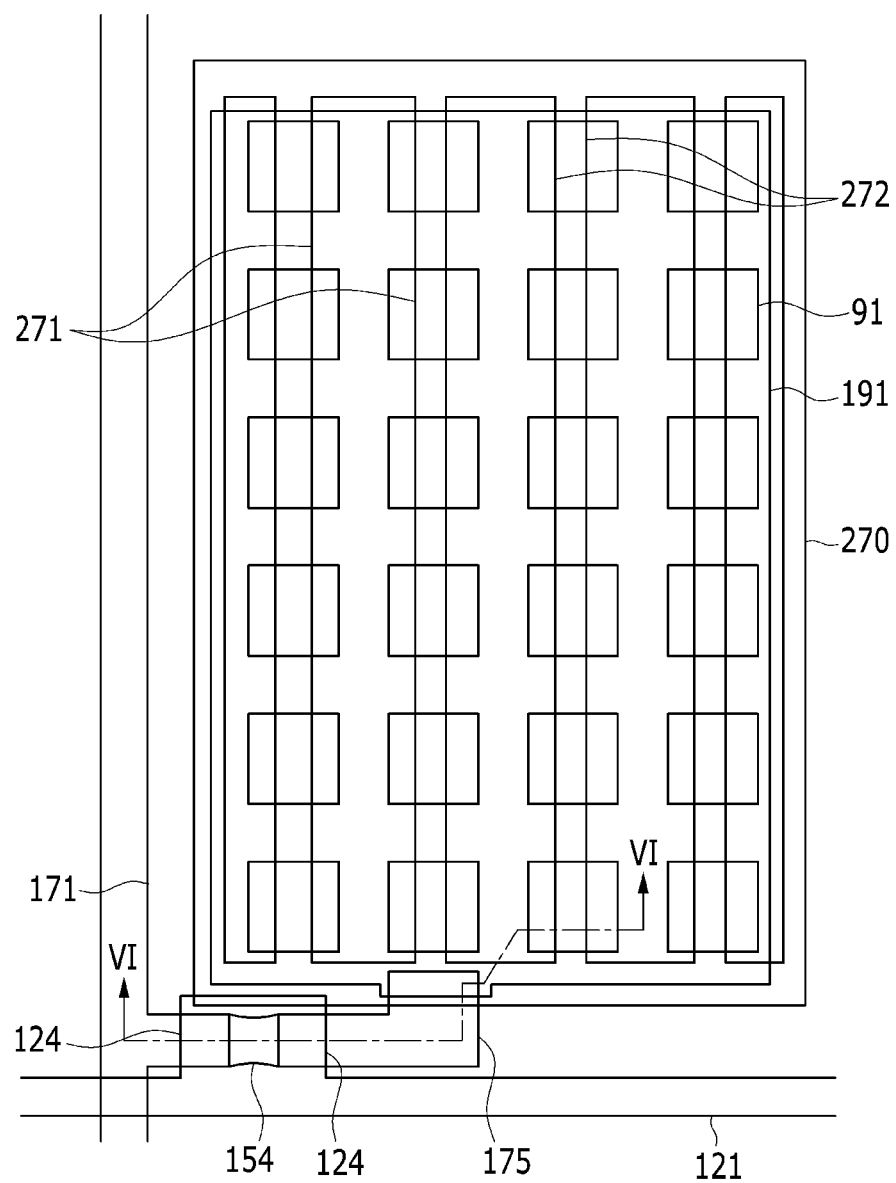
FIG. 5 is a plan view of another exemplary embodiment of a liquid crystal display according to the invention.
Figure 6:
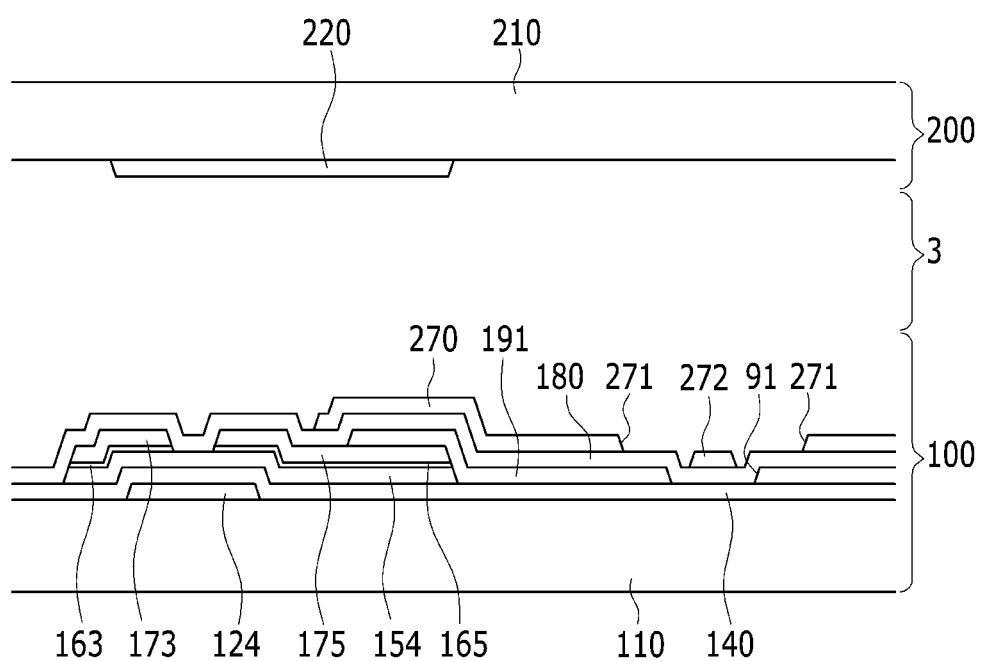
FIG. 6 is a cross-sectional view of the liquid crystal display of FIG. 5 taken along line VI-VI.

Referring to FIGS. 5 and 6, the liquid crystal display is similar to the exemplary embodiment of the liquid crystal display illustrated in FIGS. 1 to 4. The detailed description of the same constituent elements will be omitted.

The liquid crystal display of FIGS. 5 and 6 includes the lower panel 100 and the upper panel 200 which face each other, and the liquid crystal layer 3 injected therebetween.

First, the lower panel 100 will be described.

The gate line 121 is disposed on the first insulating substrate 110 including transparent glass, plastic, or the like. The gate line 121 includes the gate electrode 124, and a gate pad part (not illustrated) for connection with another layer or an external driving circuit.

The gate insulating layer 140 including silicon nitride (SiNx), silicon oxide (SiOx), or the like is disposed on the gate line 121. The gate insulating layer 140 may have a single layer structure, or a multilayer structure including at least two insulating layers having different physical properties.

A semiconductor 154 including amorphous silicon, polysilicon, or the like is disposed on the gate insulating layer 140. The semiconductor 154 may include an oxide semiconductor.

Ohmic contacts 163 and 165 are disposed on the semiconductor 154. The ohmic contacts 163 and 165 may include materials, such as n+ hydrogenated amorphous silicon, which is doped with an n-type impurity, such as phosphorus, at a high concentration, or may include silicide. The ohmic contacts 163 and 165 are paired and thus may be disposed on the semiconductor 154 in a pair. When the semiconductor 154 includes the oxide semiconductor, the ohmic contacts 163 and 165 may be omitted.

The data line 171, a source electrode 173 extending from the data line 171, and a drain electrode 175 are disposed on the ohmic contacts 163 and 165 and the gate insulating layer 140.

The data line 171 includes a data pad part (not illustrated) for connection with another layer or an external driving circuit.

The data line 171 transfers the data signal and mainly extends in a vertical direction to intersect the gate line 121.

The pixel electrode 191 is disposed on the drain electrode 175. The pixel electrode 191 has a plurality of second cutouts 91.

A passivation layer 180 is disposed on the data line 171, the drain electrode 175, the gate insulating layer 140, the exposed portions of the semiconductor 154, and the pixel electrode. The passivation layer 180 includes an inorganic insulating material and/or an organic insulating material.

A common electrode 270 is disposed on the passivation layer 180. A collective common electrode member including a plurality of common electrodes 270 is disposed on the whole surface of the first insulating substrate 110. A plurality of first cutouts 271 is defined in the common electrode 270 disposed in each single pixel region among a plurality of pixel regions defined on the first insulating substrate 110. A plurality of second branch electrodes 272 are defined by the plurality of first cutouts 271.

Although not illustrated, a first alignment layer is disposed on the common electrode 270 and the first alignment layer may be a horizontal alignment layer and is rubbed in a predetermined direction. However, in another exemplary embodiment of the liquid crystal display according to the invention, the first alignment layer may be a photo-aligned material, including the photo-reactive material.

Next, the upper panel 200 will be described.

The light blocking member 220 is disposed on the second insulating substrate 210 including transparent glass, plastic, or the like. In an alternative exemplary embodiment of a liquid crystal display according to the invention, the light blocking member 220 may be disposed in the lower panel 100 and the color filter may be further disposed in the upper panel 200.

Although not illustrated, a second alignment layer is disposed on an inner surface of the upper panel 200. The second alignment layer may be a horizontal alignment layer and is rubbed in a predetermined direction. However, in another exemplary embodiment of the liquid crystal display according to the invention, the second alignment layer may be a photo-aligned material, including the photo-reactive material.

The liquid crystal layer 3 includes the liquid crystal material having the positive dielectric anisotropy. The liquid crystal molecule of the liquid crystal layer 3 has a direction of a major axis arranged in parallel with the display panels 100 and 200. However, in another exemplary embodiment of the liquid crystal display according to the invention, the liquid crystal layer 3 may have the negative dielectric anisotropy.

The pixel electrode 191 receives the data voltage from the drain electrode 175, and the common electrode 270 receives the common voltage having a predetermined size from the common voltage applying unit (not shown) which is disposed outside the display region of the liquid crystal display.

The common electrode 270 and the pixel electrode 191 which are the field generating electrodes of the liquid crystal display, generate an electric field, such that the liquid crystal molecules of the liquid crystal layer 3 disposed between the two field generating electrodes 191 and 270 rotate in a direction substantially parallel with a direction of the electric field. The polarization of light passing through the liquid crystal layer is changed according to the rotating direction of the liquid crystal molecules determined as described above.

Unlike the exemplary embodiment of the liquid crystal display according to the invention illustrated in FIGS. 1 to 4, the exemplary embodiment of the liquid crystal display according to the invention illustrated in FIGS. 5 and 6 includes the passivation layer 180 disposed between the pixel electrode 191 which is the first field generating electrode and the common electrode 270 which is the second field generating electrode and overlaps the pixel electrode 191, the plurality of second cutouts 91 of the pixel electrode 191 disposed beneath the passivation layer 180 has a quadrangular shape and is spaced apart from each other. Further, in the structure where the pixel electrode 191 is the first field generating electrode and the common electrode 270 is the second field generating electrode which overlap each other, having the passivation layer 180 disposed therebetween, the common electrode 270 is disposed above the passivation layer 180. The plurality of first cutouts 271, and the plurality of second branch electrodes 272 which is defined by the plurality of first cutouts 271, are defined in the common electrode 270. The plurality of second branch electrodes 272 may extend in a direction parallel with the data line 171, but alternatively, the plurality of second branch electrodes 272 may extend in a direction parallel with the gate line 121.

According to the exemplary embodiment of the invention which is illustrated in FIGS. 5 and 6, dimensions (e.g., sizes) of the plurality of second cutouts 91 of the first field generating electrode are substantially uniform, but are not limited thereto. In another exemplary embodiment of the liquid crystal display according to the invention, the sizes of the plurality of second cutouts 91 may be different from each other within one pixel electrode 191.

The length of the plurality of second cutouts 91 of the first field generating electrode 191 is smaller than that of the first cutouts 271 of the second field generating electrode 270. A first cutout 271 of the second field generating electrode 270 overlaps a group of second cutouts 91 among the plurality of first cutouts in the first field generating electrode 191 along the length direction of the plurality of first cutouts of the second field generating electrode 270. That is, the first cutouts 271 of the second field generating electrode 270 respectively have a substantially linear or bar shape which extends in a predetermined direction, and the first cutouts 271 may have a length corresponding to an entire length of the group of second cutouts 91 among the plurality of second cutouts 91 of the first field generating electrode 191.

The width of the second cutouts 91 of the first field generating electrode 191 is larger than that of a second branch electrode 272 of the second field generating electrode, and in more detail, the first width of the second cutout 91 is larger than that of the second branch electrode 272 of the second field generating electrode 270 by about 0.4 µm or more.

As described above, the width of the plurality of second cutouts of the first field generating electrode is wider than that of the plurality of second branch electrodes of the second field generating electrode, such that even though the alignment error occurs between the first field generating electrode and the second field generating electrode, the overlapping areas between the plurality of second cutouts and the second branch electrodes may not be changed, thereby reducing or effectively preventing the overlapping area between the first field generating electrode and the second field generation electrode from being changed. Therefore, even though the alignment error occurs between the first field generating electrode and the second field generating electrode, the storage capacitance is not changed, thereby reducing or effectively preventing the display quality of the liquid crystal display from deteriorating.

Many features of the exemplary embodiment of the liquid crystal display according to the invention described above with reference to FIGS. 1 to 4 may be applied to the exemplary embodiment of the liquid crystal display according to the invention illustrated in FIGS. 5 and 6.

Next, Experimental Examples of liquid crystal displays will be described with reference to FIGS. 7 and 8.

In the Experimental Examples, a first case A2 represents a structure of a conventional liquid crystal display in which cutouts are not defined in the first field generating electrode among the first field generating electrode and the second field generating electrode which overlap each other having the insulating layer disposed therebetween, and a plurality of branch electrodes are defined in the second field generating electrode A second case B2 represents a structure of another conventional liquid crystal display in which cutouts are defined to extend in a direction parallel with the first field generating electrode and the second field generating electrode which overlap each other, having the insulating layer disposed therebetween. A third case C2 represents a structure of an exemplary embodiment of a liquid crystal display according to the invention in which the plurality of cutouts which are spaced apart from each other are defined in a first field generating electrode and a plurality of branch electrodes which overlap the plurality of cutouts of the first field generating electrode and are defined by a plurality of linear cutouts extending in a predetermined direction in the second field generating electrode. Results obtained by measuring transmittance and a change in the transmittance at the time of the mis-alignment when the first field generating electrode and the second field generating electrode are aligned, are illustrated in FIGS. 7 and 8.

In the Experimental Examples, the widths of the all the cutouts is set to be about 4.0 µm, and the interval between the adjacent cutouts is set to be about 2.5 µm. Therefore, the width of the branch electrodes becomes about 2.5 µm.

Figure 7:
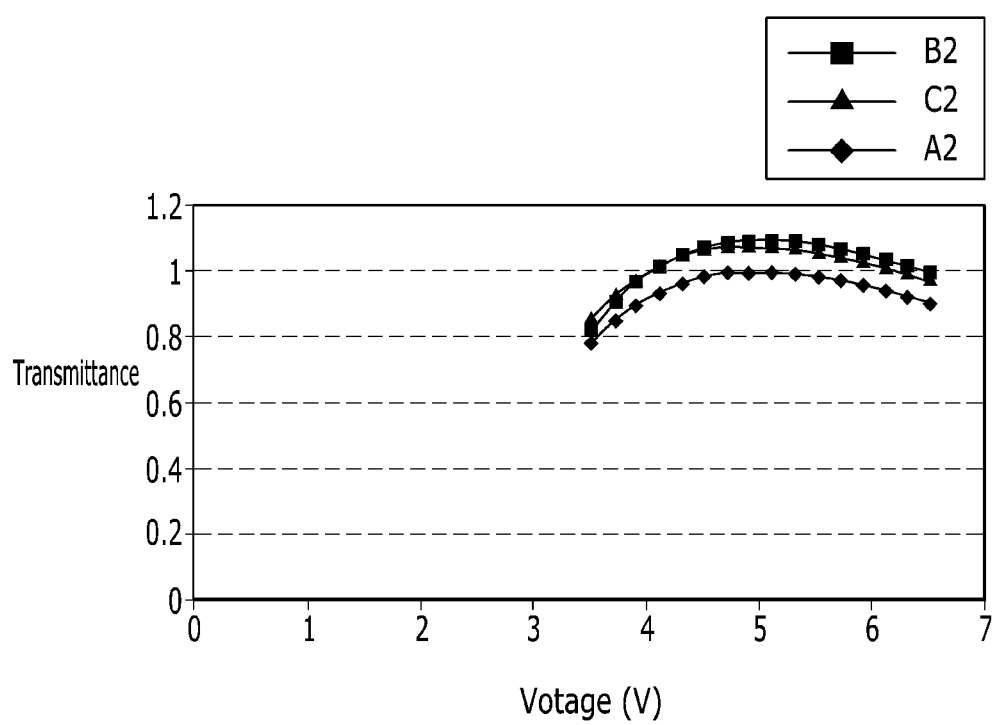
FIGS. 7 and 8 are graphs illustrating results of Experimental Examples of display devices.

FIG. 7 illustrates a comparison result of transmittance when the first field generating electrode and the second field generating electrode are aligned, in the first case A2, the second case B2 and the third case C2.

Referring to FIG. 7, it can be appreciated that compared to the first case A2 in which the cutouts are not formed in the first field generating electrode among the first field generating electrode and the second field generating electrode which overlap each other having the insulating layer disposed therebetween and the plurality of branch electrodes are formed in the second field generating electrode, in both the second case B2 in which the cutouts are formed to extend in a direction parallel with the first field generating electrode and the second field generating electrode which overlap each other, having the insulating layer disposed therebetween and the third case C2 in which the plurality of cutouts which are spaced apart from each other are formed in the first field generating electrode and the plurality of branch electrodes which overlap the plurality of cutouts of the first field generating electrode and are defined by the plurality of linear cutouts extending in a predetermined direction are formed in the second field generating electrode, the transmittance of the liquid crystal display is wholly increased.

Figure 8:
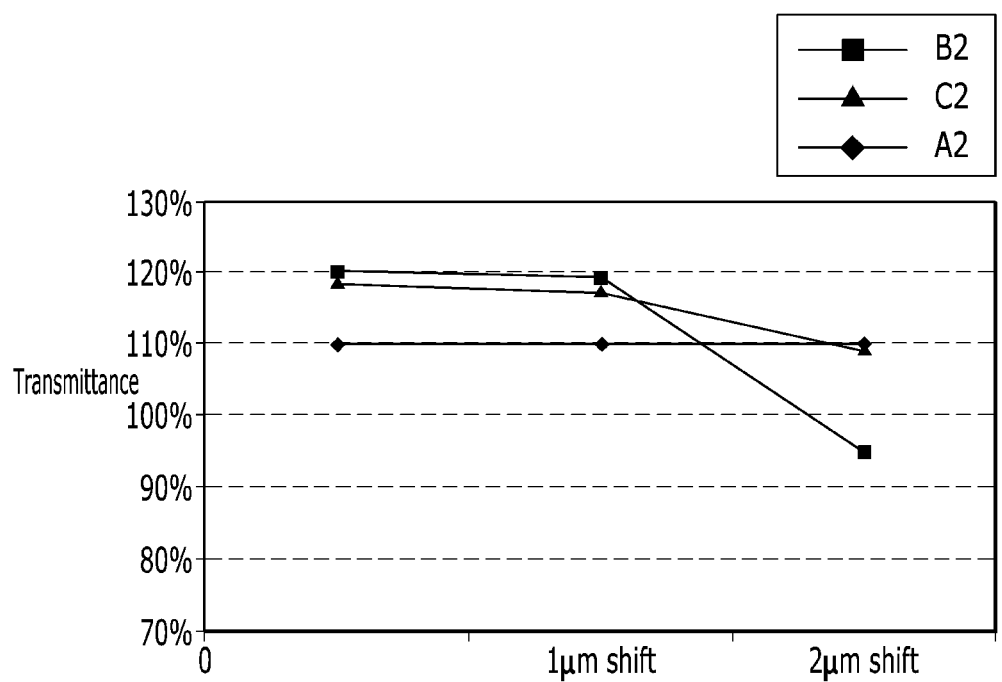

FIG. 8 illustrates the changes in the transmittance when the first field generating electrode and the second field generating electrode are mis-aligned, when the alignment error of about 1 µm occurs and when the alignment error of about 2 µm occurs, in each of the first case A2, the second case B2 and the third case C2.

Referring to FIG. 8, in the first case A2 in which the cutouts are not formed in the first field generating electrode among the first field generating electrode and the second field generating electrode which overlap each other having the insulating layer disposed therebetween and the plurality of branch electrodes are formed in the second field generating electrode, the transmittance is not significantly changed independent of the alignment error. In contrast, in the second case B2 and the third case C2, the transmittance is reduced as a whole. Further, it can be appreciated that compared to the second case B2 in which the cutouts are formed to extend in a direction parallel with the first field generating electrode and the second field generating electrode which overlap each other having the insulating layer disposed therebetween, as well as the third case C2 in which the plurality of cutouts which are spaced apart from each other are formed in the first field generating electrode and the plurality of branch electrodes which overlap the plurality of cutouts of the first field generating electrode and are defined by the plurality of linear cutouts extending in a predetermined direction are formed in the second field generating electrode, the change in transmittance is reduced depending on the alignment error value. Further, it can be appreciated that compared to the first case A2, the second case B2 in which the cutouts are formed to extend in a direction parallel with the first field generating electrode and the second field generating electrode which overlap each other having the insulating layer disposed therebetween, has the more reduced transmittance as the size of the alignment error is increased. In contrast, the third case C2 has the changed transmittance as the size of the alignment error is increased but has the transmittance substantially equal to or larger than the first case A2.

As described above, according to one or more exemplary embodiment of the liquid crystal display according to the invention, it can be appreciated that the transmittance of the liquid crystal display is increased and the change in the transmittance due to the alignment error is reduced, which means that the signal delay of the liquid crystal display may be reduced or effectively prevented by reducing the overlapping error between the pixel electrode and the common electrode and the deterioration in the display quality if the liquid crystal display may be reduced or effectively prevented by reducing the change in the storage capacitance even when the mis-alignment between the pixel electrode and the common electrode occurs.

Figure 9:
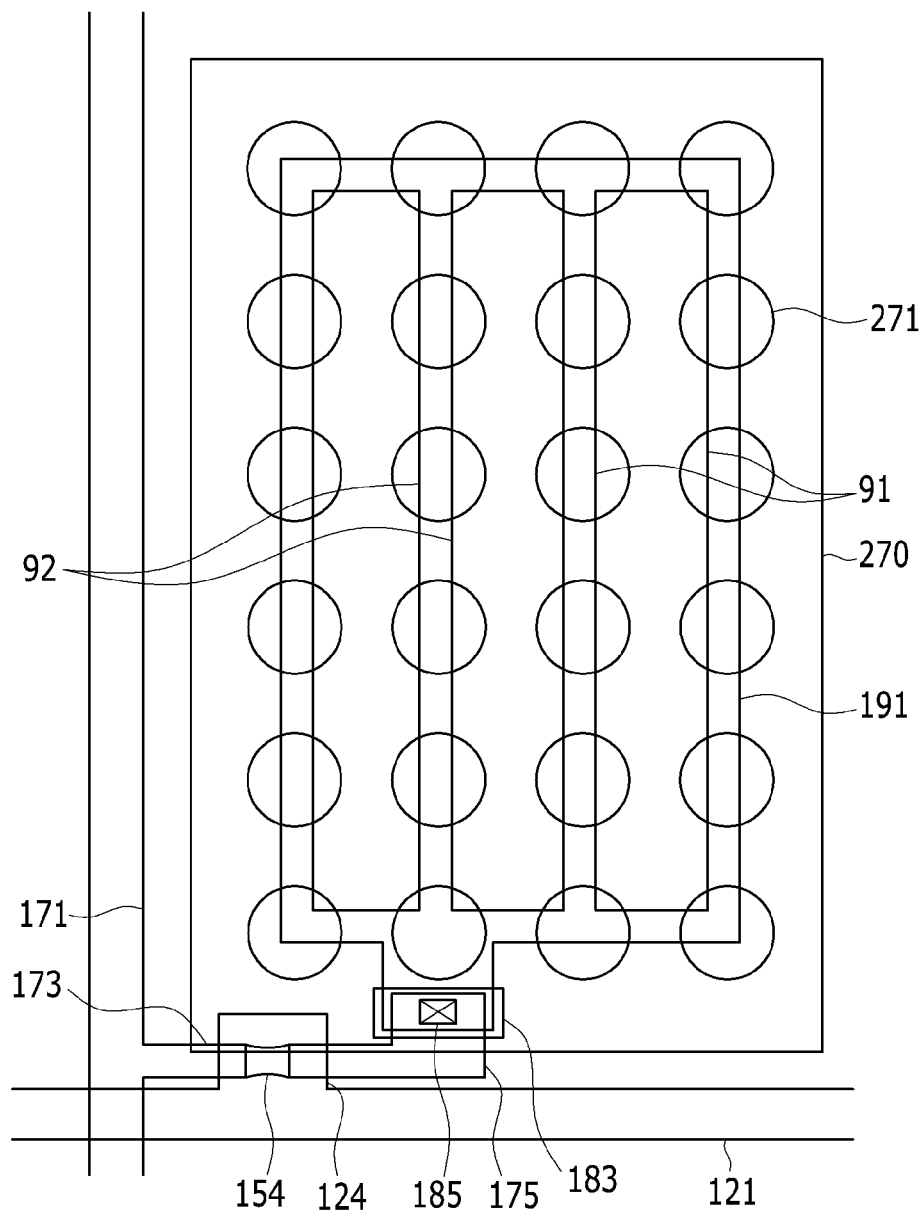
FIG. 9 is a plan view of still another exemplary embodiment of a liquid crystal display according to the invention.
Figure 10:
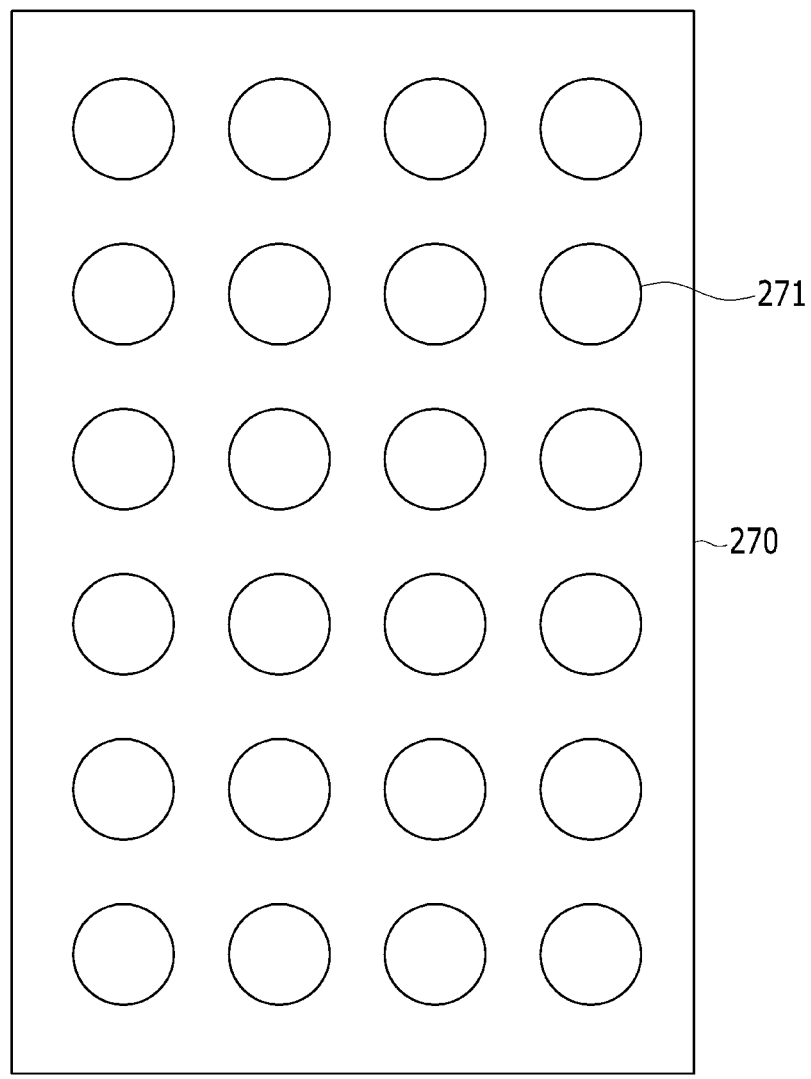
FIG. 10 is a plan view of an exemplary embodiment of a first field generating electrode of the liquid crystal display of FIG. 9.
Figure 11:
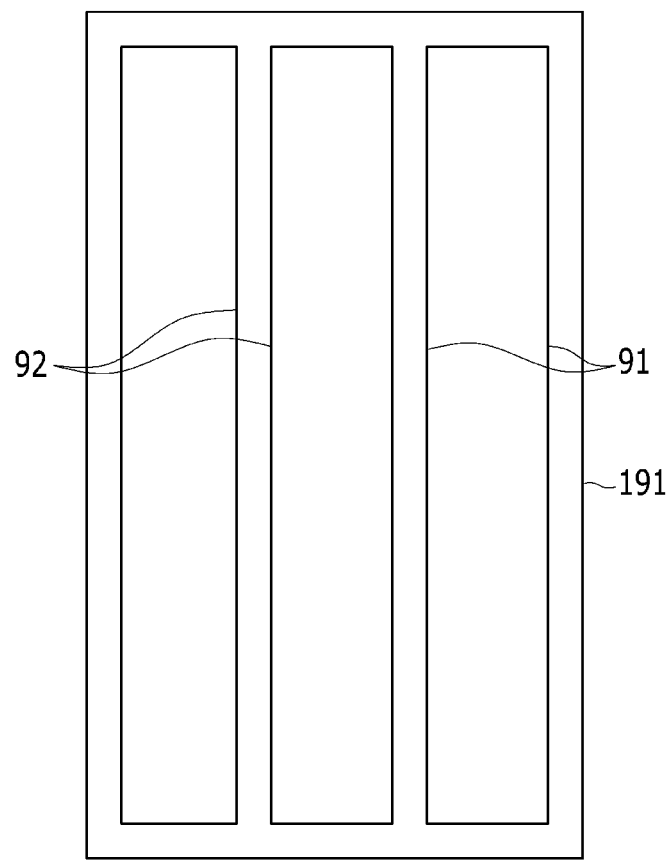
FIG. 11 is a plan view of an exemplary embodiment of a second field generating electrode of the liquid crystal display of FIG. 9.

Next, still another exemplary embodiment of a liquid crystal display according to the invention will be described with reference to FIGS. 9 to 11. Referring to FIGS. 9 to 11, the liquid crystal display is substantially the same as the liquid crystal display described with reference to FIGS. 1 to 4. The detailed description of the same constituent elements will be omitted.

Unlike the liquid crystal display described with reference to FIGS. 1 to 4, referring to FIGS. 9 to 11, in the liquid crystal display, the first cutouts 271 defined in the first field generating electrode have a circular plane shape, not the quadrangular shape. However, in alternative exemplary embodiments of the liquid crystal display according to the invention, the first cutouts 271 defined in the first field generating electrode may have any of a variety of plane shapes having a curvature, such as a circle and an oval, but not being limited thereto.

In more detail, in the common electrode 270 which is the first field generating electrode and the pixel electrode 191 which is the second field generating electrode overlapping each other having the second passivation layer 180b disposed therebetween, the plurality of first cutouts 271 is defined in the common electrode 270 which is disposed beneath the second passivation layer 180b.

The plurality of first cutouts 271 defined in the common electrode 270 which is the first field generating electrode, has a circular plane shape and the first width W1. The plurality of first cutouts 271 are spaced apart from each other.

According to the exemplary embodiment of the invention which is illustrated in FIGS. 9 to 11, sizes of the plurality of first cutouts 271 are substantially uniform, but are not limited thereto. In another exemplary embodiment of the liquid crystal display according to the invention, the sizes of the plurality of first cutouts 271 may be different from each other within one common electrode 270.

In the common electrode 270 which is the first field generating electrode and the pixel electrode 191 which is the second field generating electrode overlapping each other having the second passivation layer 180b disposed therebetween, the plurality of second cutouts 91 is defined in the pixel electrode 191 disposed above the second passivation layer 180b and the plurality of first branch electrodes 92 are defined by the plurality of second cutouts 91. The first branch electrode 92 has a second width W2.

The length of the plurality of first cutouts 271 of the first field generating electrode 191 is smaller than that of the second cutouts 91 of the second field generating electrode 191, and the second cutouts 91 of the second field generating electrode 191 overlap a group of first cutouts 271 among the plurality of first cutouts 271 along a length direction of the second cutouts 91 of the second field generating electrode 191. That is, the second cutouts 91 of the second field generating electrode 191 have a linear or bar shape which extends in a predetermined direction, and may have a length corresponding to an entire length of the group of first cutouts 271 among the first cutouts 271 of the first field generating electrode 270.

In one exemplary embodiment, the first width W1 of the plurality of first cutouts 271 is larger than the second width W2 of the first branch electrode 92 and in more detail, the first width W1 of the plurality of first cutouts 271 is larger than the second width W2 of the first branch electrode 92 by about 0.4 µm or more.

As such, the first width W1 of the plurality of first cutouts 271 is larger than the second width W2 of the first branch electrode 92, such that the overlapping areas between the plurality of first cutouts 271 and the first branch electrodes 92 may not be changed even when an alignment error occurs between the first field generating electrode and the second field generating electrode, thereby reducing or effectively preventing the overlapping area between the first field generating electrode and the second field generating electrode from being changed.

The first cutout and the second cutout are defined in the first field generating electrode and the second field generating electrode which overlap each other to reduce the overlapping area between the first field generating electrode and the second field generating electrode and reduce or effectively prevent the storage capacitance from increasing, thereby reducing or effectively preventing the signal delay of the liquid crystal display. Further, the first cutouts have a circular plane shape and are spaced apart from each other, the plurality of first branch electrodes which are defined by the second cutouts extend in a predetermined direction, and the first width of the plurality of first cutouts is larger than the second width of the first branch electrodes, such that even though the alignment error occurs between the first field generating electrode and the second field generating electrode, the overlapping areas between the plurality of first cutouts and the first branch electrodes are may not be changed, thereby reducing or effectively preventing the overlapping area between the first field generating electrode and the second field generating electrode from being changed. Even though the mis-alignment between the first field generating electrode and the second field generating electrode occurs, the storage capacitance is not changed, thereby preventing the deterioration in the display quality.

Many features of the exemplary embodiment of the liquid crystal display according to the invention described above with reference to FIGS. 1 to 4 may be applied to the exemplary embodiment of the liquid crystal display according to the invention illustrated in FIGS. 9 to 11.

Figure 12:
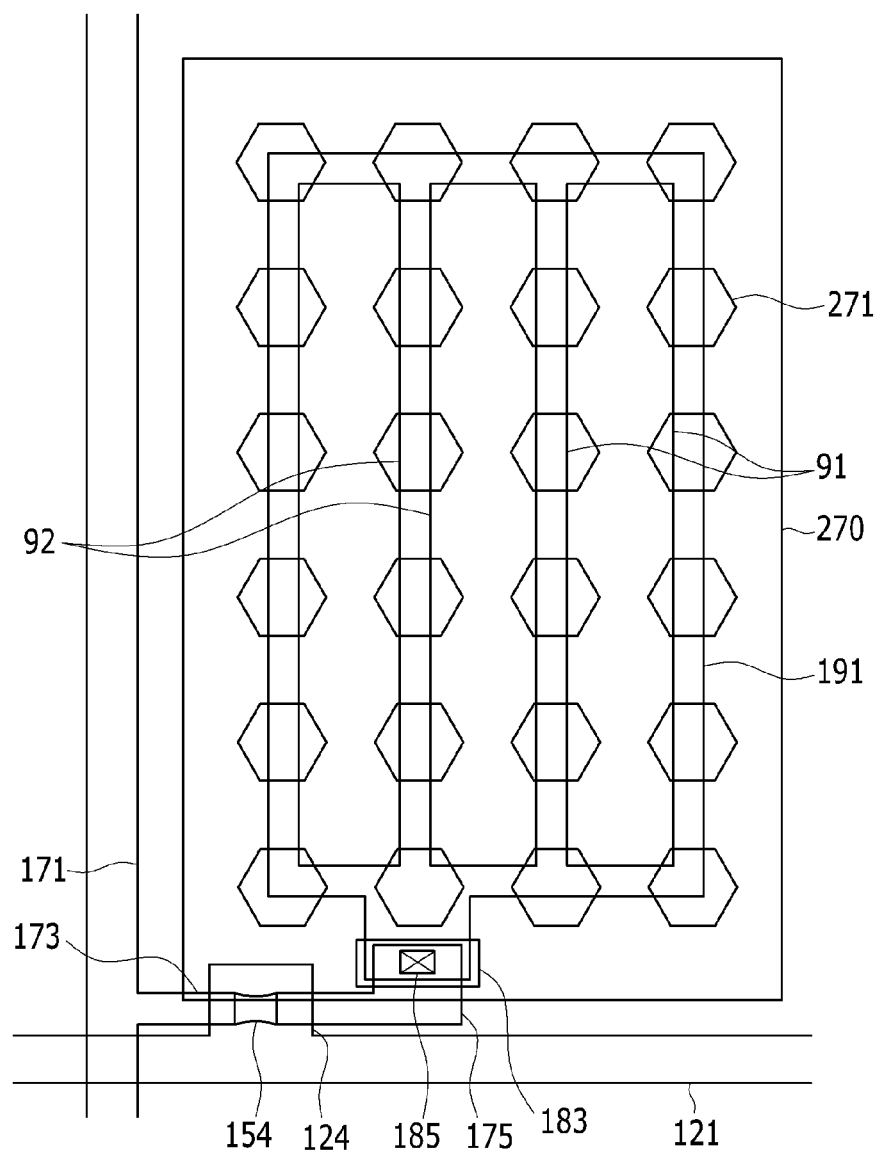
FIG. 12 is a plan view of yet another exemplary embodiment of a liquid crystal display according to the invention.
Figure 13:
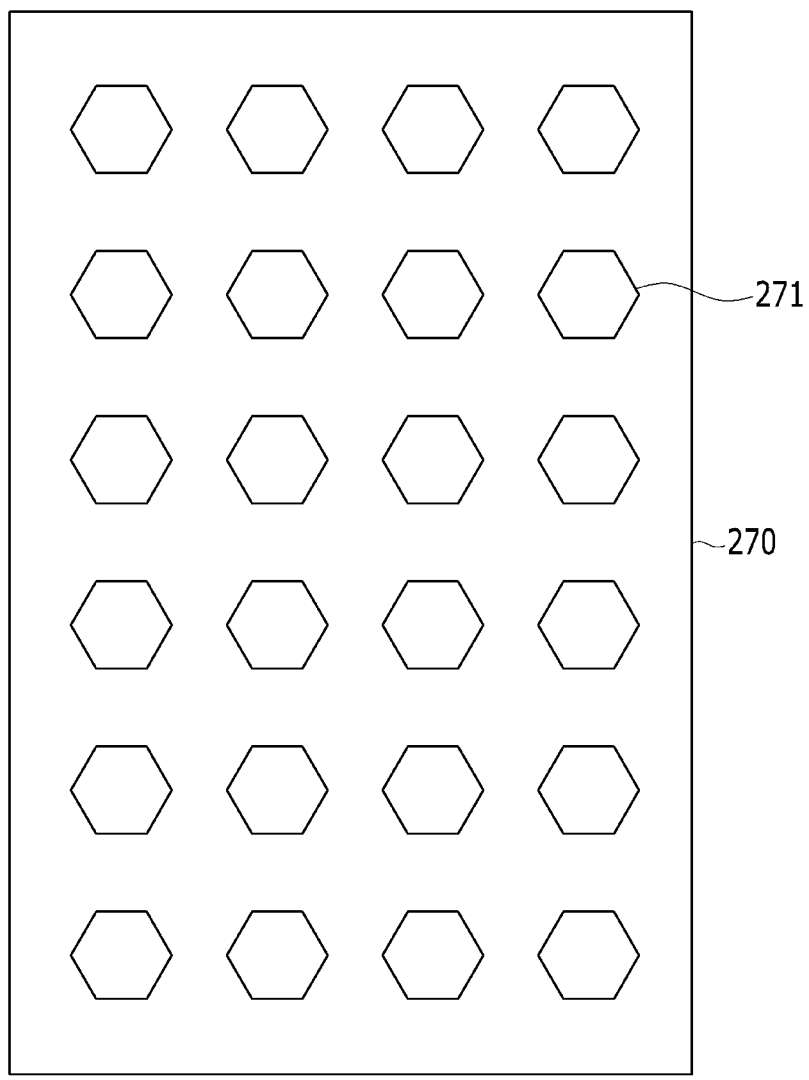
FIG. 13 is a plan view of an exemplary embodiment of a first field generating electrode of the liquid crystal display of FIG. 12.
Figure 14:
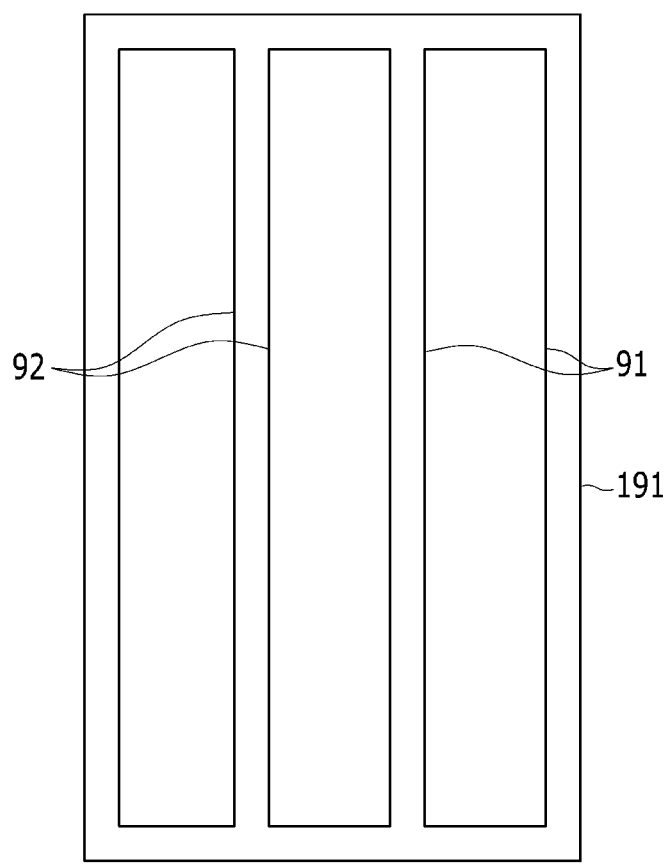
FIG. 14 is a plan view of an exemplary embodiment of a second field generating electrode of the liquid crystal display of FIG. 12.

Next, yet another exemplary embodiment of the liquid crystal display according to the invention will be described with reference to FIGS. 12 to 14. Referring to FIGS. 12 to 14, the liquid crystal display is substantially the same as the liquid crystal display described with reference to FIGS. 1 to 4. The detailed description of the same constituent elements will be omitted.

Unlike the liquid crystal display described with reference to FIGS. 1 to 4, referring to FIGS. 12 to 14, in the liquid crystal display, the first cutouts 271 defined in the first field generating electrode have a hexagonal plane shape, not having the quadrangular shape. However, in an alternative exemplary embodiment of the liquid crystal display according to the invention, the first cutouts 271 formed in the first field generating electrode may have a polygonal plane shape of other several shapes, in addition to a hexagon.

In more detail, in the common electrode 270 which is the first field generating electrode and the pixel electrode 191 which is the second field generating electrode overlapping each other having the second passivation layer 180b disposed therebetween, the plurality of first cutouts 271 is defined in the common electrode 270 which is disposed beneath the second passivation layer 180b.

The plurality of first cutouts 271 defined in the common electrode 270 which is the first field generating electrode, has a hexagonal plane shape, and the first width W1. The plurality of first cutouts 271 are spaced apart from each other.

According to the exemplary embodiment of the invention which is illustrated in FIGS. 12 to 14, sizes of the plurality of first cutouts 271 are substantially uniform, but are not limited thereto. In another exemplary embodiment of the liquid crystal display according to the invention, the sizes of the plurality of first cutouts 271 may be different from each other within one common electrode 270.

In the common electrode 270 which is the first field generating electrode and the pixel electrode 191 which is the second field generating electrode overlapping each other having the second passivation layer 180b disposed therebetween, the plurality of second cutouts 91 is defined in the pixel electrode 191 disposed above the second passivation layer 180b has and the plurality of first branch electrodes 92 are defined by the plurality of second cutouts 91. The first branch electrode 92 has a second width W2.

The length of the plurality of first cutouts 270 of the first field generating electrode 270 is smaller than that of the second cutouts 91 of the second field generating electrode 191, and the second 91 cutouts of the second field generating electrode 191 overlap a group of first cutouts 271 among the plurality of first cutouts 271 along a length direction of the second cutouts 91 of the second field generating electrode 191. That is, the second cutouts 91 of the second field generating electrode 191 have a linear or bar shape which extends in a predetermined direction, and may have a length corresponding to an entire length of the group of first cutouts 271 among the first cutouts 271 of the first field generating electrode 270.

In one exemplary embodiment, the first width W1 of the plurality of first cutouts 271 is larger than the second width W2 of the first branch electrode 92, and in more detail, the first width W1 of the plurality of first cutouts 271 is larger than the second width W2 of the first branch electrode 92 by about 0.4 μm or more.

As such, the first width W1 of the plurality of first cutouts 271 is larger than the second width W2 of the first branch electrode 92, such that the overlapping areas between the plurality of first cutouts 271 and the first branch electrodes 92 may not be changed even when an alignment error occurs between the first field generating electrode and the second field generating electrode, thereby reducing or effectively preventing the overlapping area between the first field generating electrode and the second field generating electrode from being changed.

The first cutout and the second cutout are defined in the first field generating electrode and the second field generating electrode which overlap each other to reduce the overlapping area between the first field generating electrode and the second field generating electrode and reduce or effectively prevent the storage capacitance from increasing, thereby reducing or effectively preventing the signal delay of the liquid crystal display. Further, the first cutouts have a hexagonal plane shape and are spaced apart from each other, the plurality of first branch electrodes which are defined by the second cutouts extend in a predetermined direction, and the first width of the plurality of first cutouts is larger than the second width of the first branch electrodes, such that even though the alignment error occurs between the first field generating electrode and the second field generating electrode, the overlapping areas between the plurality of first cutouts and the first branch electrodes may not be changed, thereby reducing or effectively preventing the overlapping area between the first field generating electrode and the second field generating electrode from being changed. Even though the alignment error occurs between the first field generating electrode and the second field generating electrode, the storage capacitance is not changed, thereby reducing or effectively preventing the display quality from deteriorating.

Many features of the exemplary embodiment of the liquid crystal display according to the invention described with reference to FIGS. 1 to 4 may be applied to the exemplary embodiment of the liquid crystal display according to the invention illustrated in FIGS. 12 to 14.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a first substrate;
   a common electrode on the first substrate and comprising a plurality of first cutouts;
   an insulating layer on the common electrode;
   a pixel electrode on the insulating layer and comprising:
      a plurality of second cutouts having a linear shape which extends in a length direction,
      a plurality of branch electrodes which are defined by the plurality of second cutouts and extend in the length direction, and
      a plurality of connecting electrodes which extends in a width direction crossing the length direction, wherein each of the connecting electrodes connects the plurality of branch electrodes to each other;
   a second substrate facing the first substrate; and
   a liquid crystal layer between the first substrate and the second substrate,
   wherein
   the plurality of first cutouts comprise:
      a plurality of first groups which overlap the plurality of branch electrodes and the plurality of connecting electrodes, and are spaced apart from each other in the length direction, and
      a plurality of second groups each arranged in the length direction,
      wherein in the length direction, an entirety of each of the second groups is disposed between the first groups spaced apart from each other,
   widths of the plurality of first cutouts are larger than widths of the plurality of branch electrodes in the width direction, and
   lengths of the plurality of first cutouts are larger than widths of the plurality of connecting electrodes in the length direction.

2. The liquid crystal display of claim 1, wherein:
   the plurality of first cutouts each has a discrete plane shape of a polygon, a quadrangle, a hexagon, a circle or an oval.

3. The liquid crystal display of claim 2, wherein:
   the plurality of first cutouts has a uniform size or has different sizes.

4. The liquid crystal display of claim 3, wherein:
the widths of the plurality of first cutouts is larger than those of the plurality of branch electrodes by about 0.4 micrometer or more.

5. The liquid crystal display of claim 4, further comprising:
a gate line and a data line on the first substrate,
wherein the plurality of branch electrodes extends parallel with the gate line or the data line.

6. The liquid crystal display of claim 5, wherein:
the common electrode is on a whole surface of the first substrate.

7. The liquid crystal display of claim 1, wherein:
the plurality of first cutouts has a uniform size or has different sizes.

8. The liquid crystal display of claim 1, wherein:
the widths of the plurality of first cutouts is larger than those of the plurality of branch electrodes by about 0.4 micrometer or more.

9. The liquid crystal display of claim 1, further comprising:
a gate line and a data line on the first substrate,
wherein the plurality of branch electrodes extends parallel with the gate line or the data line.

10. The liquid crystal display of claim 2, wherein:
a single one second cutout overlaps a second group among the second groups of the first cutouts in the length direction.

* * * * *